United States Patent Office 2,996,555
Patented Aug. 15, 1961

2,996,555
PREPARATION OF 2,3,3,3-TETRA-FLUOROPROPENE
Douglas A. Rausch, Midland, Mich., assignor to The Dow Chemical Company, Midland, Mich., a corporation of Delaware
No Drawing. Filed June 25, 1959, Ser. No. 822,733
7 Claims. (Cl. 260—653.4)

This invention relates to the vapor phase preparation of fluorohydrocarbons and is more particularly concerned with the preparation of 2,3,3,3-tetrafluoropropene.

The conventional method of preparing 2,3,3,3-tetrafluoropropene involves a two-step procedure calling for a dehydrochlorination of $CF_2ClCFClCH_3$ followed by a fluorination of the resultant $CF_2ClCF=CH_2$ to obtain 2,3,3,3-tetrafluoropropene. The present application provides a single step process requiring only fluorination by hydrogen fluoride.

The materials which are to be reacted in accordance with my process are three carbon atom halogenated hydrocarbons designated by the formula $CX_3CF_2CH_3$, wherein X represents the halogens chlorine, bromine and fluorine. Preparation of 2,3,3,3-tetrafluoropropene is readily accomplished in the vapor phase by passing a gaseous mixture of hydrogen fluoride and the organic material into a reaction zone maintained at a temperature above 150 degree centigrade and containing a chromium oxyfluoride catalyst. A mole ratio of hydrogen fluoride to organic of at least 2.0 should be maintained and the reactants should have a catalyst contact time of at least 1 second. Using these specific conditions it is possible to obtain yields of 2,3,3,3-tetrafluoropropene approaching theoretical and conversions of the organic starting material approaching theoretical.

While reaction temperatures as low as about 150 degrees centigrade are operative, minimum temperatures in the reaction zone of about 225 degree centigrade are desired and a reaction temperature of about 400 degrees centigrade usually employed. The reaction temperatures are maintained below those temperatures at which substantial pyrolysis occurs and preferably the temperature is maintained below 600 degrees centigrade. A contact time from 1 to 20 seconds may be employed, but contact times of 1 to 10 seconds are usually preferred.

The ratio of hydrogen fluoride to organic may be varied from 2 to 1 to 40 to 1.0, depending upon the reactor size, temperature, contact time and conversion desired. Generally, ratios from 10 to 1.0 to 20 to 1 will be employed. Pressures approximately those at atmospheric are usually employed, although higher or lower pressures may be employed, if desired.

The specific catalyst required by the process of the present invention is a chromium oxyfluoride, as described and claimed in U.S. Patent 2,745,886. This catalyst is readily prepared by contacting oxygen and a hydrate of chromium fluoride at a temperature of 500 degrees centigrade. After the fluorination reaction has been run for a time, usually less than 10 hours, reactivation as described in the above-identified patent may be required. Mixing the chromium oxyfluoride with aluminum fluoride will extend the catalyst life, however. Reactivation is readily accomplished by passing oxygen or an oxygen-containing gas over the catalyst heated at about 500 degrees centigrade.

Three carbon atom halogenated hydrocarbons represented by the formula $CX_3CF_2CH_3$, wherein X represents the halogens chlorine, bromine and fluorine, which are suitable for the process of the present invention include 1,1,1-trichloro-2,2-difluoropropane, 1-bromo-1,1-dichloro-2,2-difluoropropane, 1,1-dibromo-1-chloro-2,2-difluoropropane, 1,1,1-tribromo-2,2-difluoropropane, 1,1-dichloro-1,2,2-trifluoropropane, and the like.

The following example is given to illustrate the process of the present invention but is not to be construed as limiting the invention thereto.

Example

A one-pint vaporizer was charged with 520 grams of $CCl_3CF_2CH_3$ and heated to 60–65° C. Hydrogen fluoride was then passed through the vaporizer. The mixed vapors containing approximately a 36 to 2 mole ratio of HF to organic were then passed through a 2 x 24 inch nickel pipe reactor which contained chromium oxyfluoride heated to 400° C. for a contact time of 3 seconds.

The exit gases were then scrubbed through water to remove the excess HF and then condensed in a Dry Ice trap. 2,3,3,3-tretrafluoropropene was then separated from the reaction mixture by distillation. The yield of 2,3,3,3-tetrafluoropropene was 135 grams or 60 percent.

In a manner similar to that of the foregoing Example, 1,1,1-trichloro-2,2-difluoropropane, 1-bromo-1,1-dichloro-2,2-difluoropropane, 1,1-dibromo-1-chloro-2,2-difluoropropane, 1,1,1-tribromo-2,2-difluoropropane, 1,1-dichloro-1,2,2-trifluoropropane, and the like may be reacted to produced 2,3,3,3-tetrafluoropropene.

Various modifications may be made in the present invention without departing from the spirit or scope thereof, and it is to be understood that I limit myself only as defined in the appended claims.

I claim:
1. A process for the preparation of 2,3,3,3-tetrafluoropropene which comprises: contacting hydrogen fluoride with a three carbon atom halohydrocarbon represented by the formula $CX_3CF_2CH_3$, wherein X is selected from the group consisting of, the halogens bromine, chlorine, and fluorine, said contacting being for a contact time of 1 to 20 seconds, at a temperature range of from about 150° C. to about 600° C., in the presence of a chromium oxyfluoride catalyst, and at a mole ratio of between 2.0 to 1.0 and 40 to 1.0 hydrogen fluoride to organic; and separating 2,3,3,3-tetrafluoropropene from the reaction mixture.

2. A process for the preparation of 2,3,3,3-tetrafluoropropene which comprises: contacting hydrogen fluoride with a three carbon atom halohydrocarbon represented by the formula $CX_3CF_2CH_3$, wherein X is selected from the group consisting of the halogens bromine, chlorine and fluorine, said contacting being for a contact time of 1 to 10 seconds, at a temperature range of from about 225° C. to about 600° C., in the presence of a chromium oxyfluoride catalyst, and at a mole ratio of between 2.0 to 1.0 and 40 to 1.0 hydrogen fluoride to organic; and, separating 2,3,3,3-tetrafluoropropene from the reaction mixture.

3. A process for the preparation of 2,3,3,3-tetrafluoropropene which comprises: contacting hydrogen fluoride with a three carbon atom halohydrocarbon represented by the formula $CX_3CF_2CH_3$, wherein X is selected from the group consisting of the halogens bromine, chlorine, and fluorine, said contacting being for a contact time of 1 to 20 seconds, at a temperature of 400° C., in the presence of a chromium oxyfluoride catalyst, and at a mole ratio of between 2.0 to 1.0 and 40 to 1.0 hydrogen fluoride to organic; and, separating 2,3,3,3-tetrafluoropropene from the reaction mixture.

4. A process for the preparation of 2,3,3,3-tetrafluoropropene which comprises: contacting hydrogen fluoride with 1,1,1-trichloro-2,2-difluoropropane, said contacting time being for a contact time of at least 1 second, at a temperature ranging from about 150° C. to about 600° C. in the presence of a chromium oxyfluoride catalyst, and at a mole ratio of at least 2.0 to 1.0 hydrogen fluoride to organic; and, separating 2,3,3,3-tetrafluoropropene from the reaction mixture.

5. A process for the preparation of 2,3,3,3-tetrafluoropropene which comprises: contacting hydrogen fluoride with 1,1,1-trichloro-2,2-difluoropropane, said contacting being for a contact time of 1 to 20 seconds, at a temperature range of from about 150° C. to about 600° C., in the presence of a chromium oxyfluoride catalyst, and at a mole ratio of 36 to 2.0 hydrogen fluoride to organic; and, separating 2,3,3,3-tetrafluoropropene from the reaction mixture.

6. A process for the preparation of 2,3,3,3-tetrafluoropropene which comprises: contacting hydrogen fluoride with 1,1,1-trichloro-2,2-difluoropropane, said contacting being for a contact time of 1 to 10 seconds, at a temperature range of from about 225° C. to about 600° C., in the presence of a chromium oxyfluoride catalyst, and at a mole ratio of 36 to 2.0 hydrogen fluoride to organic; and, separating 2,3,3,3-tetrafluoropropene from the reaction mixture.

7. A process for the preparation of 2,3,3,3-tetrafluoropropene which comprises contacting hydrogen fluoride with 1,1,1-trichloro-2,2-difluoropropane, said contacting being for a contact time of about 3 seconds, at a temperature of 400° C., in the presence of a chromium oxyfluoride catalyst, and at a mole ratio of 36 to 2.0 hydrogen fluoride to organic; and, separating 2,3,3,3-tetrafluoropropene from the reaction mixture.

References Cited in the file of this patent

UNITED STATES PATENTS 2,889,379   Ruh _____ June 2, 1959

OTHER REFERENCES

Henne et al.: Journal of the American Chemical Society, vol. 68 (1946), pp. 496–7.